US006820008B1

United States Patent
van Smirren et al.

(10) Patent No.: US 6,820,008 B1
(45) Date of Patent: Nov. 16, 2004

(54) SYSTEM AND METHOD FOR MEASURING DEEP SEA CURRENTS

(75) Inventors: Jan Robert van Smirren, Sugar Land, TX (US); Caroline V. Nicholas, Houston, TX (US)

(73) Assignee: Fugro Global Environmental & Ocean Sciences, Inc., Houston, TX (US)

( * ) Notice: Subject to any disclaimer, the term of this patent is extended or adjusted under 35 U.S.C. 154(b) by 0 days.

(21) Appl. No.: 09/912,454

(22) Filed: Jul. 24, 2001

(51) Int. Cl.[7] .......................... G06F 19/00; G01S 15/00
(52) U.S. Cl. ............................................. 702/2; 367/90
(58) Field of Search .......................... 702/2; 73/170.13, 73/170.29, 170.34; 367/90, 89, 91

(56) References Cited

U.S. PATENT DOCUMENTS

| | | | | |
|---|---|---|---|---|
| 3,972,231 A | * | 8/1976 | Richardson | 73/170 A |
| 4,258,568 A | * | 3/1981 | Boetes et al. | 73/170 A |
| 5,077,700 A | * | 12/1991 | Shaw et al. | 367/91 |
| 5,315,562 A | * | 5/1994 | Bradley et al. | 367/89 |
| 5,483,499 A | * | 1/1996 | Brumley et al. | 367/89 |
| 6,052,334 A | * | 4/2000 | Brumley et al. | 367/90 |

OTHER PUBLICATIONS

"System Development for Profiling Deeper Waters in Support of the Oil and Gas Industry", Romeo et al., IEEE Conference, Mar. 1999.*

"Trends in Acoustic Velocity Log Technology at RD Instruments", Young et al., IEEE, 1998.*

"Marine Operations in Deep Water and a Variable Current Flow Environment", Yttervik et al., Norwegian Univ. of Science and Technology, Norway, Date is Unknown.*

* cited by examiner

Primary Examiner—John Barlow
Assistant Examiner—Toan M. Le
(74) Attorney, Agent, or Firm—Baker Botts L.L.P.

(57) ABSTRACT

A system and method for measuring water currents is disclosed in which an oceanographer can profile and display the water currents for an entire water column in real time. The profile is used in monitoring ocean currents that may pose a risk to the drilling riser or its contents. An ADCP is attached to a remotely operated vehicle (ROV) and transmits data to a computer system to be processed and displayed in real time. The method comprises receiving ADCP and ROV data, monitoring the heading of the current profiler, correcting and processing the data, and outputting a profile of the currents through a water column.

15 Claims, 7 Drawing Sheets

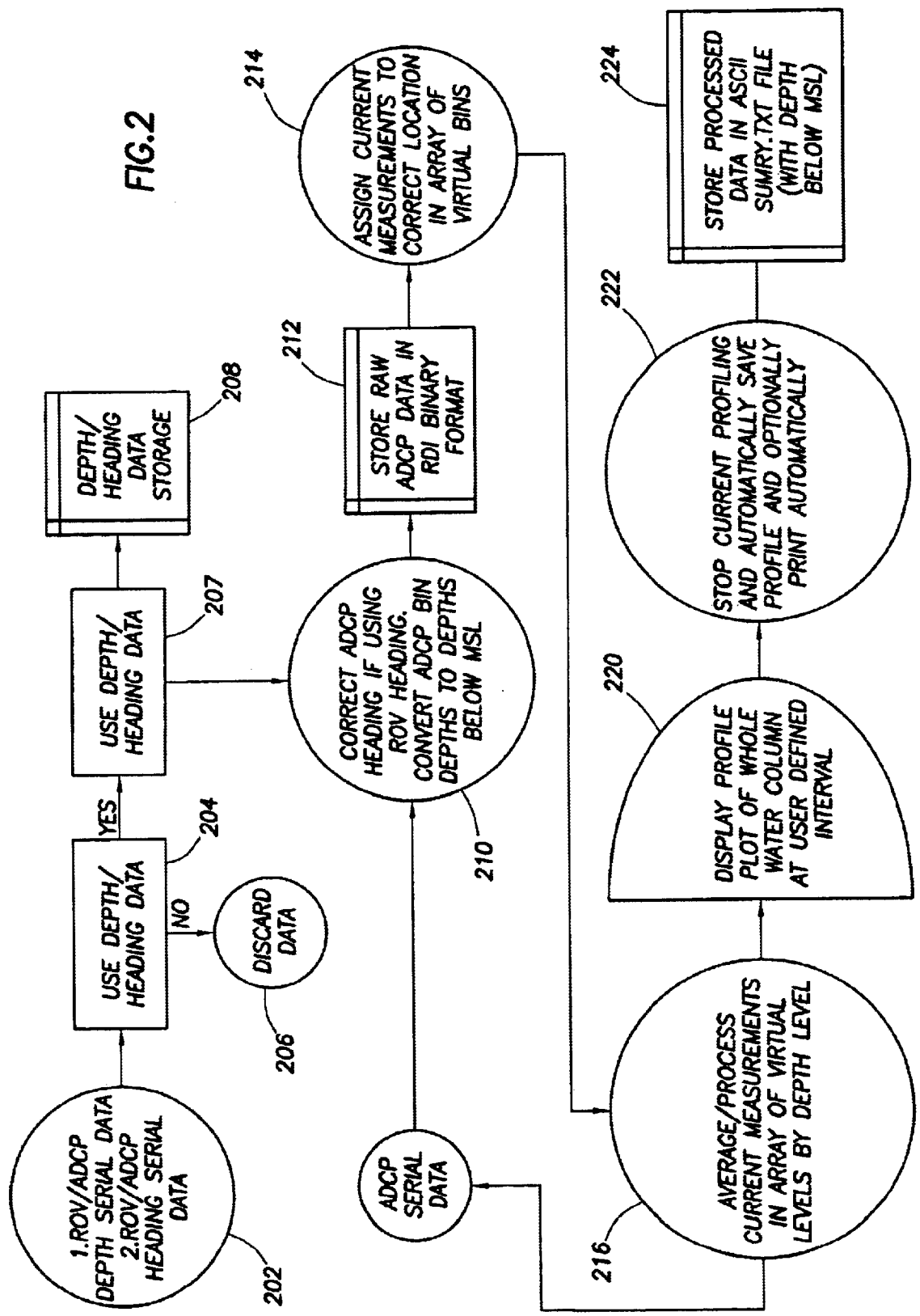

DATA FOR GIVEN BIN VALID FOR GIVEN DEPTH (m BELOW MSL ASSUMING 300m WATER DEPTH)

| BIN NO. | 2916 | 2917 | 2921 | 2925 | 2929 | 2934 | 2938 | 2942 | 2946 | 2951 | 2955 | 2959 | 2963 | 2968 | 2972 | 2976 | 2980 | 2985 | 2989 |
|---|---|---|---|---|---|---|---|---|---|---|---|---|---|---|---|---|---|---|---|
| 1 | YES | YES | YES | YES | YES | YES | YES | YES | YES | YES | YES | YES | YES | YES | YES | YES | YES | YES | NO |
| 2 | YES | YES | YES | YES | YES | YES | YES | YES | YES | YES | YES | YES | YES | YES | YES | YES | YES | NO | NO |
| 3 | YES | YES | YES | YES | YES | YES | YES | YES | YES | YES | YES | YES | YES | YES | YES | YES | NO | NO | NO |
| 4 | YES | YES | YES | YES | YES | YES | YES | YES | YES | YES | YES | YES | YES | YES | YES | NO | NO | NO | NO |
| 5 | YES | YES | YES | YES | YES | YES | YES | YES | YES | YES | YES | YES | YES | YES | NO | NO | NO | NO | NO |
| 6 | YES | YES | YES | YES | YES | YES | YES | YES | YES | YES | YES | YES | YES | NO | NO | NO | NO | NO | NO |
| 7 | YES | YES | YES | YES | YES | YES | YES | YES | YES | YES | YES | YES | NO | NO | NO | NO | NO | NO | NO |
| 8 | YES | YES | YES | YES | YES | YES | YES | YES | YES | YES | YES | NO | NO | NO | NO | NO | NO | NO | NO |
| 9 | YES | YES | YES | YES | YES | YES | YES | YES | YES | YES | NO | NO | NO | NO | NO | NO | NO | NO | NO |
| 10 | YES | YES | YES | YES | YES | YES | YES | YES | YES | NO | NO | NO | NO | NO | NO | NO | NO | NO | NO |
| 11 | YES | YES | YES | YES | YES | YES | YES | YES | NO | NO | NO | NO | NO | NO | NO | NO | NO | NO | NO |
| 12 | YES | YES | YES | YES | YES | YES | YES | NO | NO | NO | NO | NO | NO | NO | NO | NO | NO | NO | NO |
| 13 | YES | YES | YES | YES | YES | YES | NO | NO | NO | NO | NO | NO | NO | NO | NO | NO | NO | NO | NO |
| 14 | YES | YES | YES | YES | YES | NO | NO | NO | NO | NO | NO | NO | NO | NO | NO | NO | NO | NO | NO |
| 15 | YES | YES | YES | YES | NO | NO | NO | NO | NO | NO | NO | NO | NO | NO | NO | NO | NO | NO | NO |
| 16 | YES | YES | YES | NO | NO | NO | NO | NO | NO | NO | NO | NO | NO | NO | NO | NO | NO | NO | NO |
| 17 | YES | YES | NO | NO | NO | NO | NO | NO | NO | NO | NO | NO | NO | NO | NO | NO | NO | NO | NO |
| 18 | YES | NO | NO | NO | NO | NO | NO | NO | NO | NO | NO | NO | NO | NO | NO | NO | NO | NO | NO |

FIG. 4

| ARRAY DEPTH (m) | TIME (SECONDS) | | | | | | |
|---|---|---|---|---|---|---|---|
| | 1 (ADCP AT 20m DEPTH) | 2 (ADCP AT 21m DEPTH) | 3 (ADCP AT 22m DEPTH) | 4 (ADCP AT 23m DEPTH) | 5 (ADCP AT 24m DEPTH) | 6 (ADCP AT 25m DEPTH) | 7 (ADCP AT 26m DEPTH) |
| 0–25 | 0 | 0 | 0 | 0 | 0 | 0 | 0 |
| 25–50 | 6 | 6 | 5 | 5 | 5 | 5 | 4 |
| 50–75 | 6 | 6 | 7 | 6 | 6 | 6 | 7 |
| 75–100 | 6 | 6 | 6 | 7 | 6 | 6 | 6 |
| 100–125 | 2 | 2 | 2 | 2 | 3 | 3 | 3 |
| 125–150 | 0 | 0 | 0 | 0 | 0 | 0 | 0 |
| 150–175 | 0 | 0 | 0 | 0 | 0 | 0 | 0 |
| 175–200 | 0 | 0 | 0 | 0 | 0 | 0 | 0 |
| 200–225 | 0 | 0 | 0 | 0 | 0 | 0 | 0 |
| 225–250 | 0 | 0 | 0 | 0 | 0 | 0 | 0 |
| 250–275 | 0 | 0 | 0 | 0 | 0 | 0 | 0 |
| 275–300 | 0 | 0 | 0 | 0 | 0 | 0 | 0 |

FIG.5

SYSTEM AND METHOD FOR MEASURING DEEP SEA CURRENTS

TECHNICAL FIELD OF THE INVENTION

The present invention relates generally to measurement systems, and, more particularly, to a system and method for measuring water currents in real time.

BACKGROUND OF THE INVENTION

Offshore drilling operations often involve a multitude of subsea tools, equipment, and operating procedures. One of the most significant operations is the deployment, monitoring, and servicing of the drilling riser and blow out preventer (BOP). The drilling riser is the conduit for returning drilling fluids and cuttings from the well to the platform or vessel above the water surface and for conveying well gas that may need to be diverted in well control operations. The drill string extends through the drilling riser and BOP. The drilling riser is composed of a number of sections of large diameter steel tubes joined with special connectors and can be a half mile or more in length (in deepwater developments). The riser may also support kill and choke lines, a mud booster, and other ancillary lines that connect a marine drilling vessel to the undersea wellhead. The riser is usually tensioned at the top and connected to the drilling vessel by way of a telescoping slip joint. The drilling riser, however, is not tied to supporting framework such as the conductor guides of traditional bottom-founded platforms. The telescoping slip joint permits relative vertical movement of the drilling vessel versus the vertically stationary riser. Horizontal movement is, to a small extent, tolerated and allowed for by means of ball or flex joints at the top of the BOP, and at the top of the telescoping joint. However, horizontal movement must be limited to avoid damage to the riser and the associated and enclosed equipment.

Offshore drilling elements such as drilling and production risers are under the influence of ocean currents and are subject to drag forces and vortex induced vibration (VIV). Floatation modules such as buoyant air cans or syntactic foam modules may be deployed along the length of the drilling riser to render it neutrally buoyant, although forces felt by the drilling riser as a result of horizontal or lateral loading from water currents are not alleviated by the addition of floatation modules. To the contrary, the presence of floatation modules around the circumference of the drilling riser materially increases the profile presented by the riser to the water current and contributes to greater drag and VIV effects on the drilling riser. Substantial water drag and VIV induced by currents present a danger to a riser of any great length. VIV causes the riser pipe to shake, which leads to fatigue and which may eventually lead to deterioration of the steel in the pipe. In addition, a drilling riser is also affected and stressed by its own weight, its top tension, the weight of drilling fluid, and wave and current action in the water.

In high current environments, VIV can lead to the premature failure of equipment, requiring the temporary or extended halt to the drilling operation because of the equipment failure. To prevent damage, drilling operations may have to be curtailed and the riser disconnected when wave and current conditions are excessive. Further, lateral load from drag may deform the drilling riser to a bowed shape that presents excessive angles with respect to the derrick at the top and the well at the bottom. As a result, as the drill string rotates within the drilling riser, the drill string may contact the drilling riser at these transition points and be subjected as a result to excessive and premature wear.

Other reasons for disconnecting the drilling riser include anticipated heavy weather (rig motions become too Large in response to high winds and seas) or the inability of the vessel to remain on location over the well site (due to heavy weather, equipment malfunctions, and operator error). If sufficient time is available, the drill string is withdrawn to the rig before disconnecting the drilling riser. If the drilling string is not withdrawn to the rig before disconnecting the riser, drilling equipment can be seriously damaged and in some cases a serious accident or oil spill could result. Conversely, if an emergency disconnect is made prematurely in a situation in which the predicted displacement limit would not have been reached by actual conditions, the resulting monetary expenditure due to possible mud loss and the cost of the time required to reconnect (possibly involving the retrieval of the sheared portion of drill string from within the well) and recommence drilling operations could easily be in the order of hundreds of thousands of dollars.

Because of the dangers posed by drag and VIV, ocean currents beneath and around offshore rigs are typically measured and monitored, often by using a current profiler such as an acoustic Doppler current profiler (ADCP). The measurement of accurate current velocities is important in such fields as weather prediction, biological studies of nutrients, environmental studies of sewage dispersion, and commercial exploration for natural resources, including crude oil. An ADCP is a current-measuring instrument that transmits through the water high frequency acoustic signals, which when downconverted to human hearing frequencies sound like "pings." The current is determined by a Doppler shift in the backscatter echo from plankton, suspended sediment, and bubbles of the water, all assumed to be moving with the mean speed of the water. Time gating circuitry is employed which uses differences in acoustic travel time to sort the currents measured into range intervals, called depth cells or bins. The allocation of measured currents into depth cells permits the development of a three-dimensional profile of the speed and direction of current over part or all of a water column. An ADCP can be deployed from a vessel, a buoy, or a bottom platform. Typically, ADCPs are used to measure horizontal current velocities in a vertical column. The vertical water column is divided into a number of depth cells along the length or height of the water column. Dividing the data of the ADCP in this manner produces a profile of water velocities along the height of the water column.

Data gathering of oceanographic parameters has increased in recent years. Known techniques for measuring water currents have used moored current meters such as ACDPs to gather data representative of currents. In addition to the use of ADCPs for the measurement of currents, other meters are moored to measure temperature and other ocean characteristics. Time series recording of data of this sort is generated from fixed instruments on taut-wire moorings in the deep ocean and on continental shelf and slope locations.

ADCP meters that are moored to a drilling rig are rarely stationed more than a few hundred meters from the water surface. Without a deep moored ADCP, however, no data can be gathered concerning the speed and direction of current at greater depths. This lack of data leaves oceanographers unable to collect data concerning the currents that exist at depths that are not reached by a moored ADCP. Because a drilling riser may be buffeted in different directions at different depths, water currents at depth levels beneath the deepest of the moored ADCP meters are of significant concern to an oceanographer charged with predicting water currents along the length of the drilling riser. The often sparse and inadequate data generated by moored ADCPs has prompted efforts by scientific researchers to install a current meter on a remotely operated vehicle (ROV).

In this configuration, the current meter is fixed to the ROV, which travels in a downward direction adjacent to the drilling riser. During the travel, the current meter records current measurements as it travels along the length of the drilling riser. This measurement technique is deficient in that the presence of the ROV substantially distorts the measurements made by the current meter.

SUMMARY OF THE INVENTION

In accordance with the present invention, a method for measuring water currents is provided that substantially eliminates or reduces the disadvantages and problems associated with existing methods for measuring water currents. The measuring system of the present invention allows for the measurements of currents in real time through the entire depth of a water column, such as a deep sea water column that is adjacent to a drilling and/or production riser. The system comprises an ROV, an ADCP, and a computer system. The current profiler or ADCP is coupled to the ROV. As the ROV moves vertically within the water column, data collected by the ADCP and ROV is transmitted to a computer system located at a platform or vessel. The computer system receives the data, and processes and outputs real-time data concerning the velocity and heading of currents in the water column. The current profiler or ADCP may include a shroud to shield the transducers of the ADCP from extraneous noise and to dampen mechanical vibrations from the ROV.

One advantage of the present invention is the ability to receive data indicative of the current velocity, current heading, and depth in real-time. This data can then be processed in real-time to create a nearly instantaneous water current profile of the entire water column. Real-time profiling is especially advantageous with respect to deepwater drilling, because deepwater drilling risers are fastened at the water surface and at the seabed, but not tied to supporting framework. Potentially dangerous horizontal movement of the drilling vessel and/or risers may be closely monitored in real time, in accordance with the present invention. Thus, real-time profiling provides data that are crucial to limiting or preventing equipment damage caused by water currents or VIV that may be made more dangerous with the addition of floatation modules to the riser.

Another advantage of the present invention is the ability to enable prediction of drilling vessel and riser movement and stress. Drift of the drilling vessel, heavy or otherwise dangerous currents, and VIV may be predicted on the basis of data provided by the present invention. Successful prediction, in turn, is advantageous in that equipment damage and oil or gas leakage may be averted, saving downtime, repair, and cleanup expenses. Premature and costly disconnection of the riser may also be averted if currents and VIV are predicted to be manageable.

In profiling an entire water column, the present invention is further advantageous in that it automatically removes bad data points through processing. Bad data points may include points outside the water column or on the seabed. Automatically removing spurious data points from the calculation is necessary for the integrity of real-time data processing. A further advantage of the present invention concerns the prevention of false or inaccurate data points that are caused by noise or vibration. The shroud covering the top and sides of the current profiler shields the current profiler from noise and vibration generated by the ROV and the environment. Another advantage of the present invention is that the processing of the data may be conducted only on the basis of data collected by the ADCP, if it is determined that the data collected by the ADCP is of a sufficient quality. Other advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 2 is a flow diagram of a deep sea current measuring process of the present invention;

FIG. 4 is a tabular representation of the validity of currents measurement data given its bin and the ADCPs depth in the present invention;

FIG. 5 is a tabular representation of the number of single ping data points detected given a bin and the ADCPs depth in the present invention;

DETAILED DESCRIPTION OF THE INVENTION

Figure 1A:
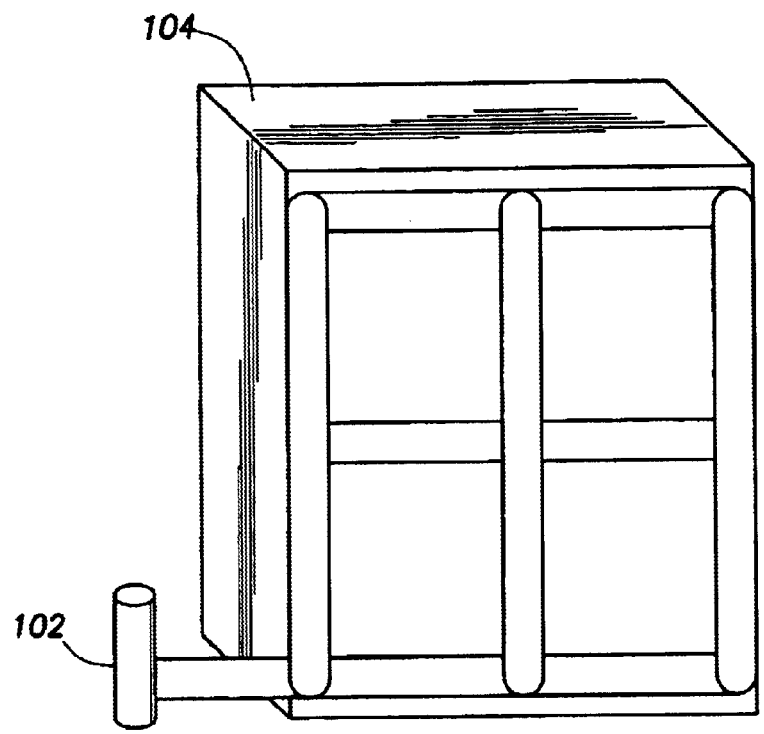
FIG. 1a is a diagram of a front view of an ADCP attached to an ROV of the present invention.

The measuring system of the present invention facilitates the measuring of water currents in real time through the entire depth of a water column, such as a deep sea water column adjacent to a drilling and/or production riser. The system includes an ROV, a current profiler, and a computer system that processes and outputs real-time data produced by the ROV and current profiler. FIG. 1a is a diagram of a front view of an ADCP 102 coupled to an ROV 104. ADCP 102 and ROV 104 are coupled to one another such that the transducers of the ADCP are facing downward relative to the bottom plane of the ROV 104. The transducers of the ADCP may be flush with or slightly above or below the bottom plane of the ROV 104. Because the transducers are located on the same plane as the ROV, the measurement of currents in the water column by the ADCP is not disturbed or affected by the downward movement of the ROV in the water column, allowing for accurate current measurement of current flows by the ADCP.

Figure 1B:
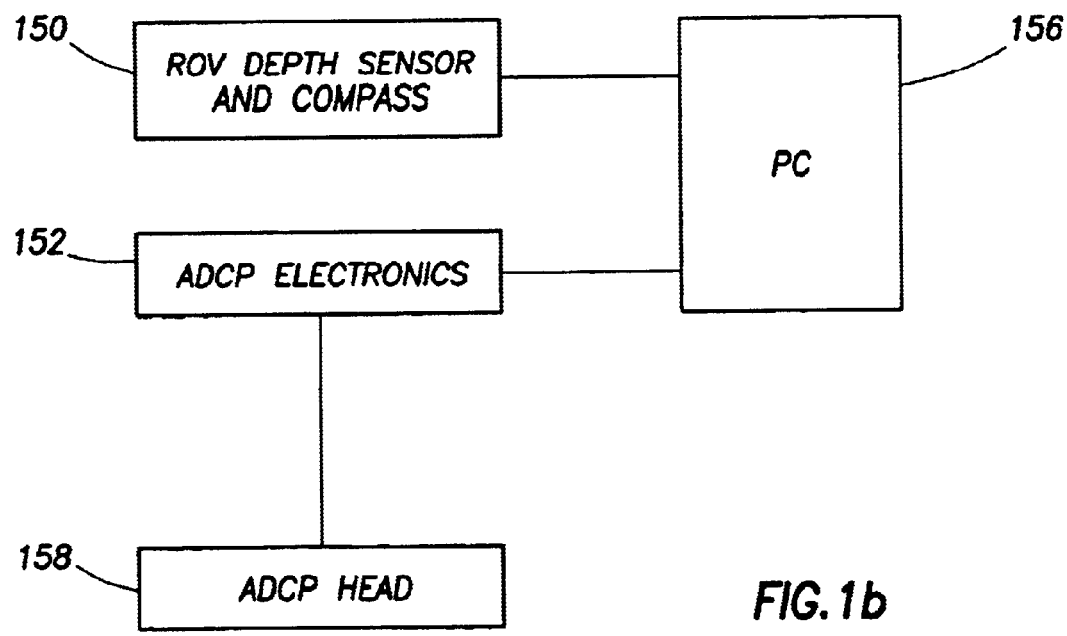
FIG. 1b is a block diagram of the components of the ROV/ADCP system of the present invention.

FIG. 1b is a block diagram of the components of the ROV/ADCP system. The ADCP typically includes an internal compass. During those periods that the ADCP is coupled to the ROV or ROV cage, the internal compass of the ADCP, which is sensitive to electromagnetic interference, may be disabled. During the period that the internal compass of the ADCP is disabled, heading data for the ADCP is derived from the compass of the ROV or ROV cage. If heading data is collected from the internal compass of the ROV, the heading data is combined with current measurements from the ADCP to transform the heading data from heading data relative to the coordinates of the ship to heading data that is relative to the coordinates of the Earth. As an alternative to acquiring depth and heading data from the ROV, depth and heading data may be acquired from the ADCP if the acoustic and magnetic interference at the ADCP is determined to be either negligible or does not otherwise interfere with the depth and heading measurements of the ADCP. As such, depth and heading data may be taken by the ROV, or depending on the severity of acoustic and magnetic interference, depth and heading data may be taken by the ADCP.

ADCP module 152 processes its acoustic input data and then outputs data to a personal computer or other digital processing unit 156. The output data of ADCP module 152 includes water current data The water currents are apportioned among depth cells within the water column under analysis. The depth cells are defined to be in the reference frame of the ADCP. The allocation of a measured water current to a depth cell is made on the basis of the distance of the current flow or ping from the ADCP. As the ADCP moves up and down the water column, the depth cells move with reference to the ADCP. ROV depth and heading sensor 150 sends ROV depth and heading data to personal computer 156. ADCP head 158 transmits to ADCP electronics module 152 raw heading data. The depth and heading data transmitted to computer 156 by ROV depth and heading sensor 150 includes water current measurements that are assigned to virtual bins. The assignment of current measurement data to virtual bins is made on the basis of current measurement data and fixed depth data. The fixed depth data is made with reference to the position of the ADCP in the water column as measured in a fixed reference frame of the seabed or water surface. As such, the virtual bins exist in the fixed reference frame of the water column. As the ADCP moves, the virtual bins of the water column data are stationary within the water column under analysis.

FIG. 2 is a flow diagram of a deep sea current measuring method. As discussed with reference to FIGS. 1a and 1b, the water column under analysis is divided into a number of depth cells and virtual bins. By using the ROV or ADCP depth data and current velocity data from each depth cell or virtual bin, as collected by the transducers of the ADCP, individual data points are mapped into the appropriate virtual bins. The individual data points of each virtual bin are then processed to provide a single current vector for each virtual bin. The current vector includes both a heading and a value of the velocity of the current flow in the virtual bin. In step 202 of FIG. 2, the ROV collects depth and heading data and transmits the data through a tethered cable (not shown) in real time to the surface platform or vessel. Using RS-232 data protocol via intermediary line converters and drivers, the tethered cable permits two-way communications between the ADCP and the computer at the platform or vessel. The tethered cable also permits at least one-way communication from the ROV depth/heading input port to the computer at the platform or vessel.

Because the ADCP is rigidly attached and in close proximity to the ROV, the depth and heading data of the ROV may be used to determine the real-time depth and heading of the ADCP. The depth of the ADCP varies with the depth of the ROV. As the ROV moves downward in the water column, the ADCP, because of its direct coupling to the ROV, moves downward in the water column. Because the ADCP is capable of moving vertically in the water column, the absolute depth of each water column depth cell, which is measured relative to the position of the ADCP, will continually change. In step 204 of FIG. 2, the depth and heading data is received at the computer system on the platform or vessel. If the received data will not be processed, the data is discarded at step 206 and the method steps of FIG. 2 end.

At step 207, if the ROV depth and heading data is not discarded at step 206, the data is passed for offline data storage and processing. At step 208, the data is stored for later processing in data files. Each of the data files is associated with a dive number and a date. At step 210, the ROV or ADCP heading data is used to correct the coordinate system of the ADCP from an ADCP north, east, and up coordinate system to a true north, east, and up coordinate system. Also in step 210, the current velocity data of each depth cell is assigned a depth measurement (in units of meters below mean sea level (MSL)). At step 212, the current measurement is stored as data having a frame of reference relative to the ADCP.

In step 214, all current velocity data that is in the reference frame of the ADCP is assigned to a virtual bin, which is associated with the absolute depth of the measured data along the depth of the water column. In step 216, data in each virtual bin is processed. The result is a single water current velocity measurement per virtual bin. The processing of the data is done to organize the data in a way in a manner that the data can be easily understood on visual presentation. Processing the data across each virtual bin tends to eliminate spurious or outlying data points and to thereby increase the accuracy of the overall measurement. In step 220, the array of averaged current velocity data for each virtual bin in the water column is displayed graphically via an output device to a user. The display form is a representation of a water column, with a single water current measurement being displayed per bin. At a user-defined interval (such as a single refresh every ten seconds), the data of the water column is updated with new averaged current velocity data.

In step 222, the operator may terminate the procedure to store the processed current velocity data. The data, which still exists in the reference frame of the water column, is stored in units of meters below MSL. Periodically storing the data at step 222 provides the user with a historical record of the currents in the water column. The data stored as part of step 222 may be stored in an ASCII format in a standard text file at step 224. As an option, a graphical form of the stored data, such as the graphical form of the water column of step 220, may be printed. The data parameters of FIG. 2 are measured, calculated, and/or transmitted in the following units: current speed in units of meters per second or knots; current velocity in meters per second or knots; current direction in degrees towards (clockwise from Magnetic North); heading direction in degrees towards (clockwise from Magnetic North); virtual bin range in meters or feet; temperature in degrees Celsius; and pitch/roll in degrees.

Figure 3:
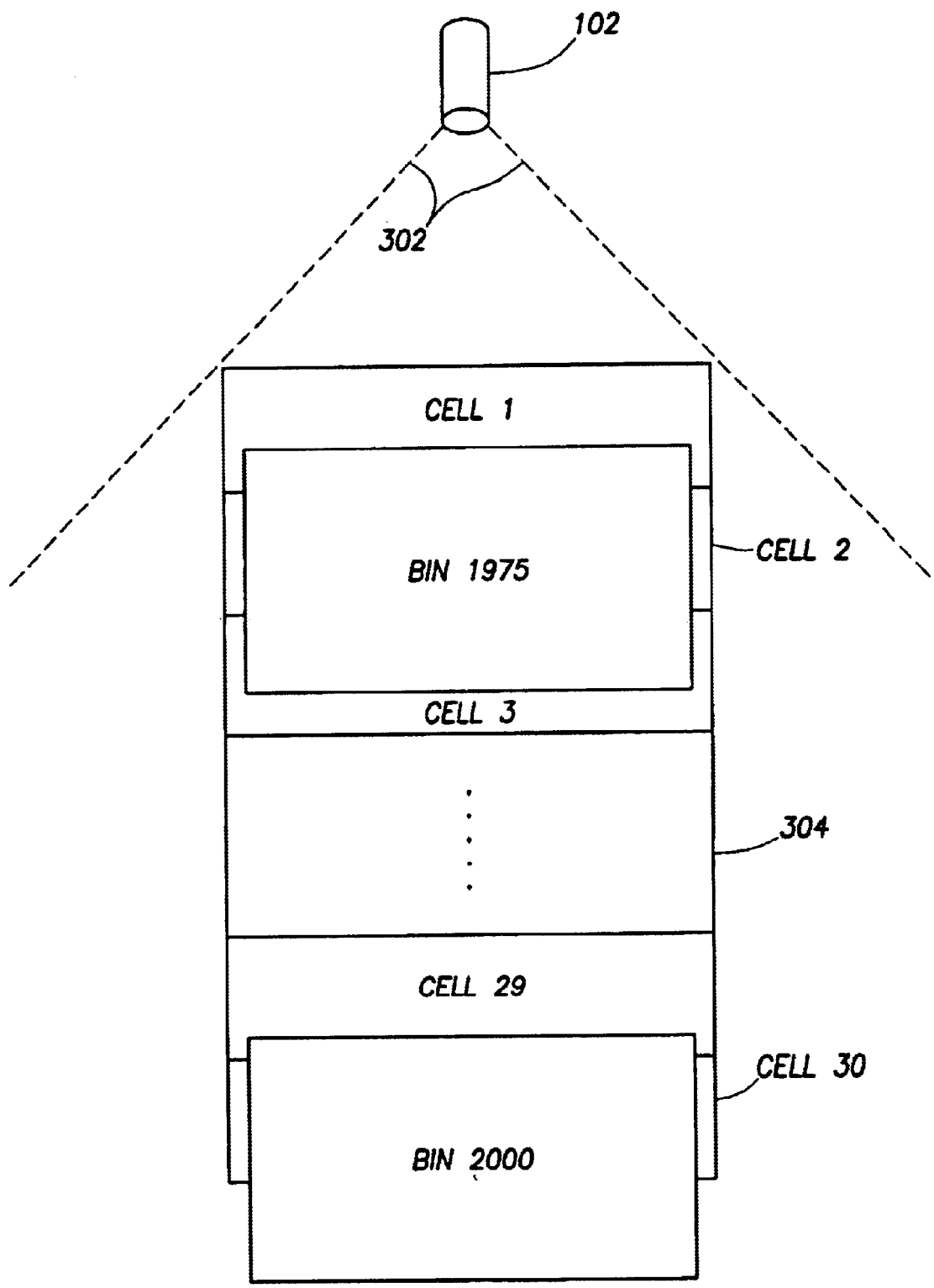
FIG. 3 is a diagram of an ADCP in the process of measuring current and a water column divided into cells in the present invention, with virtual bins overlaid.

Shown in FIG. 3 is a diagram of an ADCP that is transmitting in a downward direction through the water column a set of acoustic signals. As part of the measurement of the water currents in the water column, the transmitted acoustic signals follow a path from their source that is similar to a solid cone. As shown in FIG. 3, water column 304 is divided into a number of depth cells (labeled "Cell 1" through "Cell 29"), together with a number of virtual bins that overlay the depth cells. The transducers of ADCP 102 are pointed to receive and transmit signals downward toward the ocean floor. The acoustic waves emitted by ADCP 102 are in the shape of four beams 302 in a Janus configuration.

In the Janus configuration, the four downward pointing beams are also pointed in different lateral directions, at lateral right angles to each other. Because the range of beams 302 is limited, it is known that any return signals received by ADCP 102 are signals that are the result of contact between outgoing acoustic waves and particles found within the range of beams 302. Thus, as ADCP 102 travels downward or upward, ADCP gathers data by transmitting an acoustic wave and receiving an acoustic wave reflected from points within the water column. Data reflected from outside water column 304 and data reflected from the seabed is identified and discarded, as described more fully with reference to FIG. 4.

When taking measurements, ADCP 102 categorizes data into depth cells. The depth cells of the water column 304 (cell 1 through cell 29 in the example of FIG. 3) are in the same frame of reference as ADCP 102. In the depth cell naming convention of FIG. 3, depth cell 1 is identified as the depth cell adjacent to ADCP 102. Depth cells 2, 3, 29, and 30 are also shown, with depth 30 being the cell farthest from ADCP 102. It should be recognized that ADCP 102 has a finite range for receiving valid ping data. The range of an ADCP may, for example, be 300 feet. Because the range of the ADCP is limited, the ADCP may not be able to make measurements of current flows within all of the depth cells and virtual bins of the water column.

FIG. 4 is a table depicting the validity of data associated with depth cells in the water column as judged by the actual depth of the ADCP. The table is used to determine which of the collected depth cell data points are valid. A depth cell data point is valid if the data is retrieved on the basis of a measurement made from inside the water column. A depth cell data point is not valid if it was made on the basis of a measurement outside the water column. The horizontal headings of the table of FIG. 4 represent depths in meters below MSL, with the assumption that the water depth is a maximum of 3000 meters. The vertical heading of the table are the depth cells under analysis. The entries of the table represent the validity of the data measured by the ADCP. The validity of the data is a function of the distance of the ADCP below MSL. The table of FIG. 4 shows validity data for depths from 2916 meters to 2989 meters. As the ADCP travels farther below MSL, the depth cells that are the farthest from the ADCP contain data that is invalid. As the ADCP nears the surface of the sea bed, only those depth cells nearest the ADCP (depth cell 1, for example) are deemed to have valid data.

FIG. 5 is a table representing the number of depth cell data points detected in each bin according to a given depth of the ADCP. The table identifies the number of detected data points in each bin of the water column as the ADCP is lowered through the water column at a rate of approximately 1 meter per second. The horizontal headings of table 50 represent time in units of seconds, assuming that the first second corresponds to the time when the ADCP is at a depth of 20 meters below MSL. The table of FIG. 5 identifies time data points 1 through 7. The vertical rows of table of FIG. 5 represent array depth boundaries in units of meters below MSL. This table lists array depth boundaries in ranges from 0–25 meters through 275–300 meters. As shown, the detection range of the ADCP, in meters, is approximately 5–100 meters. Thus, the ADCP can measure data that is a distance of 5–100 meters from the ADCP as the ADCP moves up or down in the water column. No return data is detected by the ADCP outside of this range. Because the return data detected by the ADCP in the example of FIG. 5 are numerous enough to acquire accurate current velocity data from each depth cell and each virtual bin, the listed ADCP descent speed of 1 meter per second is slow enough to elicit valid data.

Figure 6:
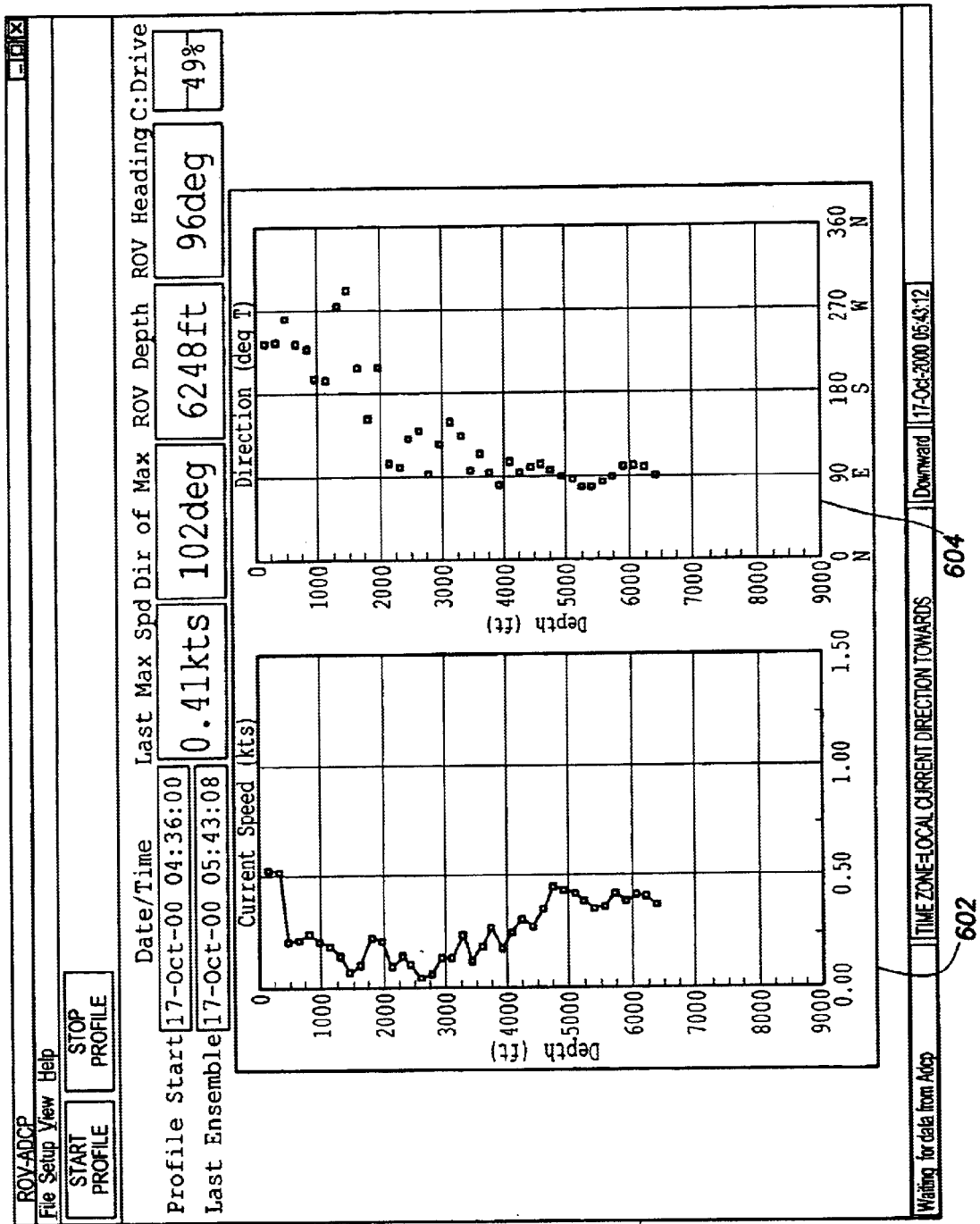
FIG. 6 is a screen shot of a graphical user interface in which real-time, processed, ocean current data is available to the software user of the invention.

Referring now to FIG. 6, a screen display of a graphical user interface (GUI) 601 for manipulating and reviewing the current speed and direction data retrieved by the ROV/ADCP is shown. Included in the interface of FIG. 6 is a real-time representation of the depth of the ROV in meters below MSL, the heading of the ROV in degrees from magnetic North, the maximum speed of currents so far detected in knots. Included in FIG. 6 are tables 602 and 604. Table 602 is a graphical representation of the speed of currents in knots in the water column as a function of depth as measured by meters below MSL. Table 604 is a graphical representation of the headings of currents in degrees from geographic North in the water column as a function of depth as measured by meters below MSL. Also included in the GUI of FIG. 6 is a Start Profile button. Initiating the process by clicking the Start Profile button starts the water column profiling method described with respect to FIG. 2. Options within the GUI of FIG. 6 include pull-down menus (not shown) for choosing the ROV depth/heading input port, the baud rate for transmitting ROV depth/heading data, and a flag to indicate whether the system should automatically print when the Stop Profile button is clicked by the user. In this manner, the user can also manually stop the gathering of data by the current profiler.

Figure 7:
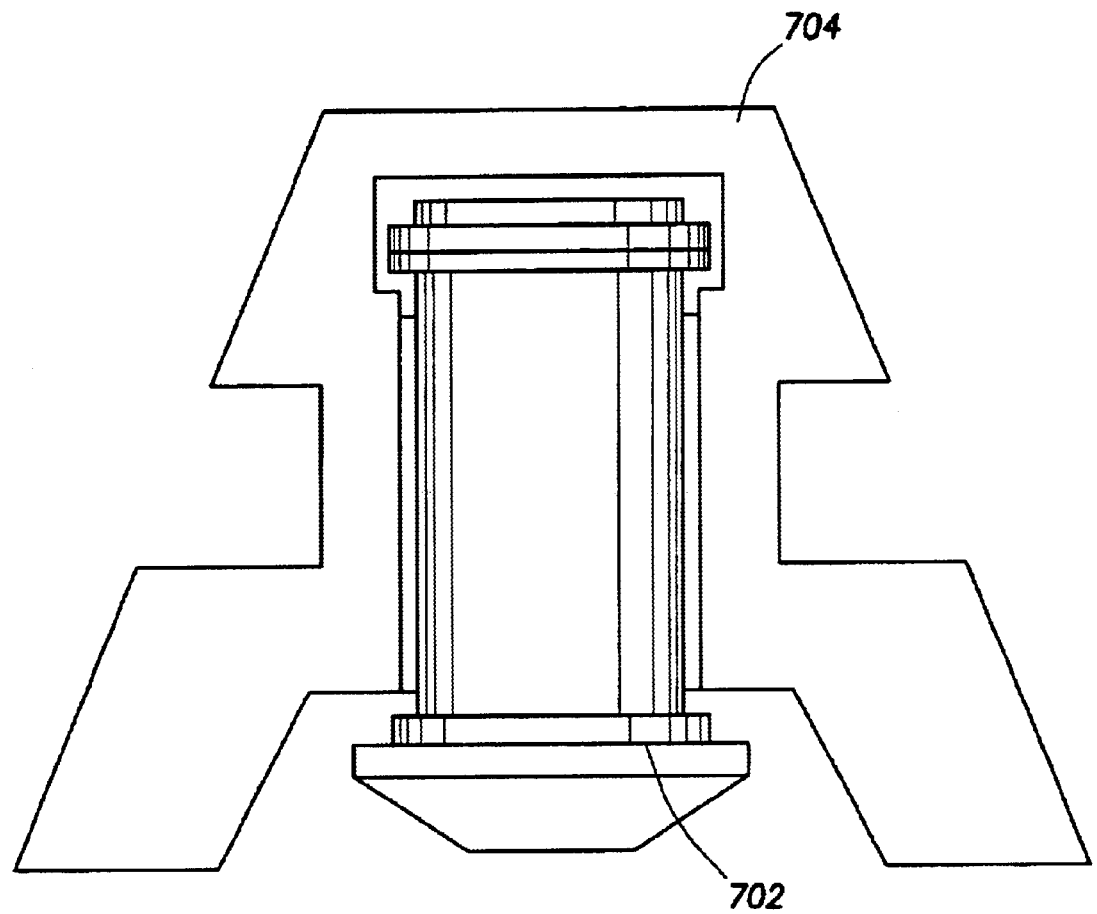
FIG. 7 is a diagram of a cross-sectional view of an ADCP covered by a shroud.

FIG. 7 is a diagram of a cross-sectional view of an ADCP that includes a shroud 704. ADCP 702 is downward facing, and shroud 704 is attached to ADCP 702 such that shroud 704 shields all sides of ADCP 702 except for the downward-facing side of the ADCP 702. Shroud 704 prevents acoustic interference from reaching the sensitive transducers of ADCP 702. As a result, the transducers of the ADCP 702 are better able to emit and absorb acoustic waves, while being shielded by the shroud 704 from external noise that may reach the area of the ADCP and the water column. The ROV itself may be significant source of extraneous noise. In addition, in those instances in which the ADCP is clamped to an ROV, the mechanical connection of the ROV and the ADCP will transmit vibrations and other noise into the water column and the area of the ADCP. The placement of shroud 704 over the ADCP will also serve to dampen mechanical vibrations from the connection of the ROV and ADCP. Shroud 704 may be composed of a syntactic foam or any other suitable material capable of shielding noise and dampening vibration.

It should be recognized that the ADCP and ROV described herein may be after-market components combined according to the teachings of the present invention. Alternatively, the ADCP and ROV may be marketed as a combination in which the ADCP is meant to be removable or permanently affixed to the ROV. Although the present invention has been described in detail, it should be understood that various changes, substitutions, and alterations can be made thereto without departing from the spirit and scope of the invention as defined by the appended claims.

What is claimed is:

1. A water current measuring system comprising:
   a remote operated vehicle ROV, the ROV being operable to move in a vertical direction in a water column and to collect data while moving in the vertical direction in a water column;
   an acoustic Doppler current profiler ADCP coupled to the ROV, the ADCP being operable to move in a vertical direction in a water column and to collect data while moving in the vertical direction in a water column; and a computer system for receiving and processing the collected ADCP data and the collected ROV data and displaying processed data in real time as the ADCP and ROV are moving in the vertical direction through a water column;

wherein the processed data includes depth and heading data from the ADCP data if such depth and heading data is of a sufficient quality.

2. The system of claim 1, wherein the face of the current profiler on which its acoustic transducers are attached is downward-facing.

3. The system of claim 1, wherein the face of the current profiler on which its acoustic transducers are attached is upward-facing.

4. The system of claim 1, wherein the system is used to measure water currents in a deep-sea water column.

5. The system of claim 4, wherein the deep-sea water column is adjacent to a drilling and/or production riser used in drilling for oil, gas, or other substances.

6. The system of claim 1, wherein the ADCP is shrouded.

7. The system of claim 1, further comprising a shroud coupled to and covering the ADCP and including an opening for the transmission and receipt of signals by the transducers of the ADCP.

8. A method for processing water current measurements in real time, comprising the steps of:

receiving depth and heading data from a remote operated vehicle ROV as the ROV is moving in the vertical direction through a water column, the data being representative of and associated with a depth cell of the water column being traversed by the ROV;

receiving from an acoustic Doppler current profiler ADCP as the ADCP is moving in the vertical direction through a water column water current velocity data, the ADCP being coupled to the ROV and the water current velocity data being representative of and associated with a depth cell of a water column being traversed by the ADCP;

receiving depth and heading data from the ADCP if the depth and heading data of the ADCP is substantially free of interference;

processing the current velocity data from each depth cell into data associated absolute depth;

assigning absolute depth data to virtual bins;

processing the data for each bin; and outputting the data at a regular interval.

9. The method for processing water current measurements of claim 8, further comprising the step of storing the depth and heading data received from the ROV or the ADCP.

10. The method for processing water current measurements of claim 8, further comprising the step of storing the current velocity date at a second regular time interval.

11. The method for processing water current measurements of claim 8, further comprising the step of manually stopping the gathering of data by the current profiler.

12. The method for processing water current measurements of claim 11, further comprising the step of storing the processed data for each bin.

13. The method for processing water current measurements of claim 8, wherein the current profiler is rigidly attached to the ROV; and wherein the face of the current profiler on which its acoustic transducers are attached is downward-facing.

14. The method for processing water current measurements of claim 8, wherein the current profiler is rigidly attached to the ROV; and wherein the face of the current profiler on which its acoustic transducers are attached is upward-facing.

15. The method for processing water current measurements of claim 8, wherein the step of outputting the data at a regular interval comprises the step of providing a graphical display of the processed data.

* * * * *